United States Patent [19]

Zito, Jr.

[11] Patent Number: 4,482,614
[45] Date of Patent: Nov. 13, 1984

[54] ZINC-BROMINE BATTERY WITH LONG TERM STABILITY

[75] Inventor: Ralph Zito, Jr., Durham, N.C.

[73] Assignee: Gel, Inc., Durham, N.C.

[21] Appl. No.: 441,491

[22] Filed: Nov. 15, 1982

[51] Int. Cl.³ .............................................. H01M 2/40
[52] U.S. Cl. ...................................... 429/70; 429/101
[58] Field of Search ...................... 429/17, 38, 39, 101, 429/199, 18, 70, 154

[56] References Cited

U.S. PATENT DOCUMENTS

| | | | |
|---|---|---|---|
| 3,625,764 | 12/1971 | DeRossi | 429/199 |
| 3,738,870 | 6/1973 | DeRossi | 429/198 |
| 3,811,945 | 5/1974 | DeRossi | 429/199 |
| 3,827,915 | 8/1974 | Zito | 429/86 |
| 4,038,459 | 7/1977 | Ajami et al. | 429/101 |

FOREIGN PATENT DOCUMENTS 1065815  4/1967  United Kingdom ............... 429/154

Primary Examiner—Donald L. Walton
Attorney, Agent, or Firm—Cohen & Burg

[57] ABSTRACT

Zinc-bromine battery with recirculating electrolyte and multi-cell array, with predominant concentration of the bromine in the array at all stages of battery cycling; an array of bipolar electrode assemblies (16) with anode (26A) and cathode (26C) faces, including in each such assembly a chamber of unbound—but well contacted (electrically)—charcoal (C) stored at the cathode face and means for controlling zinc plating and deplating at the anode face; and with provision of surface area enhancement at the anode and cathode faces; electrolyte flow, pH and recirculation controls inherent in the construction, all comprising an anti-degradation combination generally.

14 Claims, 11 Drawing Figures

ZINC-BROMINE BATTERY WITH LONG TERM STABILITY

BACKGROUND OF THE INVENTION

The present invention relates to zinc-bromine secondary batteries of the general class described in the following U.S. patents.

Bloch U.S. Pat. No. 2,566,114
Zito U.S. Pat. No. 3,285,781
Zito U.S. Pat. No. 3,640,777
Bloch U.S. Pat. No. 3,373,058
Blue U.S. Pat. No. 3,408,232
Bloch U.S. Pat. No. 3,576,503
deRossi U.S. Pat. No. 3,625,764
deRossi U.S. Pat. No. 3,738,870
Maricle U.S. Pat. No. 3,806,368
deRossi U.S. Pat. No. 3,811,945
Walsh U.S. Pat. No. 3,816,177
Zito U.S. Pat. No. 3,827,915
Leddy U.S. Pat. No. 3,929,506

Despite technical promise and substantial effort this energy storage system has not achieved commercial acceptance. Problems inhibiting system use include self discharge characteristics; hazards associated with bromine; high internal resistance (and consequent power loss); severe material requirements and costs associated with the artifacts necessary to accommodate the above factors; polarization; thermal runaway; gas evolution; and, perhaps of over-riding significance, system degradation in extended usage such that long-term reliability could not be assured for the batteries.

It is the object of the present invention to provide effective energy storage overcoming the foregoing problems, particularly the avoidance of long term system degradation.

SUMMARY OF THE INVENTION

Energy storage is provided by a secondary battery comprising a multiple cell array and circulation of electrolyte through the cells and around a substantially closed liquid loop circulating system outside the cells. The electrolyte comprises aqueous zinc-bromide solution, per se or with resistance depressing and/or plating brightener additives and/or bromine complexing additives to suppress bromine volatility.

Each cell is of a single electrolyte type; that is, no means are provided to split the cell into two electrolyte compartments with distinctly different electrolyte flows therein. The latter artifact is often employed in the prior art to prevent parasitic chemical reaction between bromine and zinc. However, a pseudo-two compartment structure is employed in each cell by creating a low flow pool of electrolyte in a charcoal containing region at each cathode face by a membrane separating such pool from a high flow rate pool.

Each cell comprises a positive electrode (cathode) with porous surfacing to store molecular bromine and a negative electrode (anode) which serves as a substrate for zinc deposition. During charging the reactions:

$$Zn^{++} + 2e \rightleftarrows Zn \quad (I)$$

$$2Br^- \rightleftarrows Br_2 + 2e \quad (II)$$

occur, proceeding primarily to the right, with bromine adsorption at the cathode and zinc plating at the anode. Secondary reactions simultaneously occurring along with (I) and (II) during discharge and/or charge involve partial electrolysis of additives or of the salts provided (e.g., to decrease resistivity) and/or of the polyethylene glycol or tetra ammonium halides which may have been provided to suppress bromine volatility, if any in the electrolyte and to a small extent of the water itself and hydrolysis, including hydrolysis of bromine. During discharge the main reactions (I) and (II) proceed in reverse (i.e. to the left) to return zinc and bromine to solution. Gasses formed on battery operation tend to escape. Bromine vapor pressure goes from 100 mm Hg at 0° C. to about 600 mm at 50° C.

It is found that the secondary reactions are negligible or sufficiently countered through the system of the present invention they will not prevent repeatable charge and discharge over thousands of cycles. In some instances, these secondary reations are promoted and used to maintain system stability. For instance, active carbon embedded in the electrode (positive electrode side, at least) catalyzes the hydrolysis of molecular bromine and liberates oxygen from the water, to compensate inevitable drift of system pH. The electrodes are provided and cells are defined by an array of intermediate electrode assemblies with opposing anode and cathode faces, described further below in this summary.

The present invention provides construction and arrangement such that zinc bromide molarity of the electrolyte is 0.5 to 1.5 at full charge and 2 or 4 at deep discharge. This low molarity throughout cycling limits safety hazards, holds resistivity to an acceptable range and limits zinc attack in a single cell. This low molarity corresponds to low density (1.06 gm/cc at 0.5 molar, 1.72 gm/cc at 4.0). In contrast prior art systems range over 4 Molar and over 2.0 gm/cc at some stage of cycling.

It is important to the present invention to limit volume of bromine in circulation outside the cell to a small percent of total molecular bromine of the system. At least a substantial majority of molecular bromine should be in the cell array trapped in electrode assemblies, at all times, with less than about 1/100 (by weight), preferrably less than 1/300th in the external circulating loop. During discharge most of the bromine released from the cathode storage site is converted to the zinc bromide solution form thereof.

Each cell has the form of a thin volume defined by confronting anode and cathode electrodes, each having an aspect ratio (height to width) of more than 2.0, but less than 10.0, and preferably arranged with an electrical series, hydraulic parallel array of such cells utilizing mid-bipolar electrodes and using end electrodes with external connections. The mid and end electrode edges may be sealed to prevent cell to cell leakage of electrolyte and also to prevent leakage to the exterior of the cell array. A circulating system for the array comprises intake and outlet mainfolds, a circulating loop, a pump and a, preferably small, storage reservoir, a heat exchanger, vent means, drain means, and electrolyte measuring means. The drain feature allows quick emptying of the cell array in case of catastrophic electrical or chemical runaway condition therein.

The battery system of the invention, in a high power version, affords high power density, 200-400 watts per pound, consistent with 3-6 watt hours per pound energy density at drain rates of 60C-120C continuous for 1-3 minutes, with 10-20% voltage sag. Such characteristic, combined with long life (several years) and capability of repeated cycling over thousands of cycles, make the system suitable for construction into various sizes (various number of cells for voltage and various electrode areas for current) for application such as: diesel engine starting batteries, peaking power sources for electric vehicles ranging from golf carts to trucks and tractors, shop and field power tools, regenerative brake fly wheel devices, and the like. The high energy storage version could provide, e.g. at drain rates withstand of about c/4 an energy density over 40 watt-hours per pound (over 5 kwh per cubic foot of volume).

The limited recirculation of the system of the present invention, together with the array construction thereof and means for assuring uniform flow and reaction conditions, provides uniform temperature distribution throughout the device and uniform reactant supply, prevention of zinc denrites shorting out from anode to cathode, reduced polarization and a means of electrolyte measurement and modification (physically or chemically).

The end and mid-electrodes have, e.g., minimal thicknesses, on the order of 0.10" to 0.030" respectively and inter-electrode spacings of about 0.05" for a high power version and spacing of up to about 0.30" for a low power versions. They afford low resistances, on the order of milliohms even in 10–100 cell arrays (for 6 to 110 volt devices). For most practical purposes electrode edge lengths of 20 by 40 inches to as low as 2 by 4 inches will be utilized. The electrodes are hot pressed plastic substrates (preferably polyvinyl/chloride-graphite composites) with face particles of porous carbon bonded to the substrate. The end electrodes have metal screens adhered to their substrates or encapsulated in such substrates.

These and other objects, features and advantages of the invention will be apparent from the following detailed description of preferred embodiments with reference therein to the accompanying drawing in which:

BRIEF DESCRIPTION OF THE DRAWING

FIG. 1 is a schematic view of the basic elements of a battery in a diagrammatically show system including a recirculating loop according to a preferred embodiment of the invention and FIGS. 1A and 1B are cross-sections of a detail of;

DETAILED DESCRIPTION OF PREFERRED EMBODIMENTS

Figure 1:
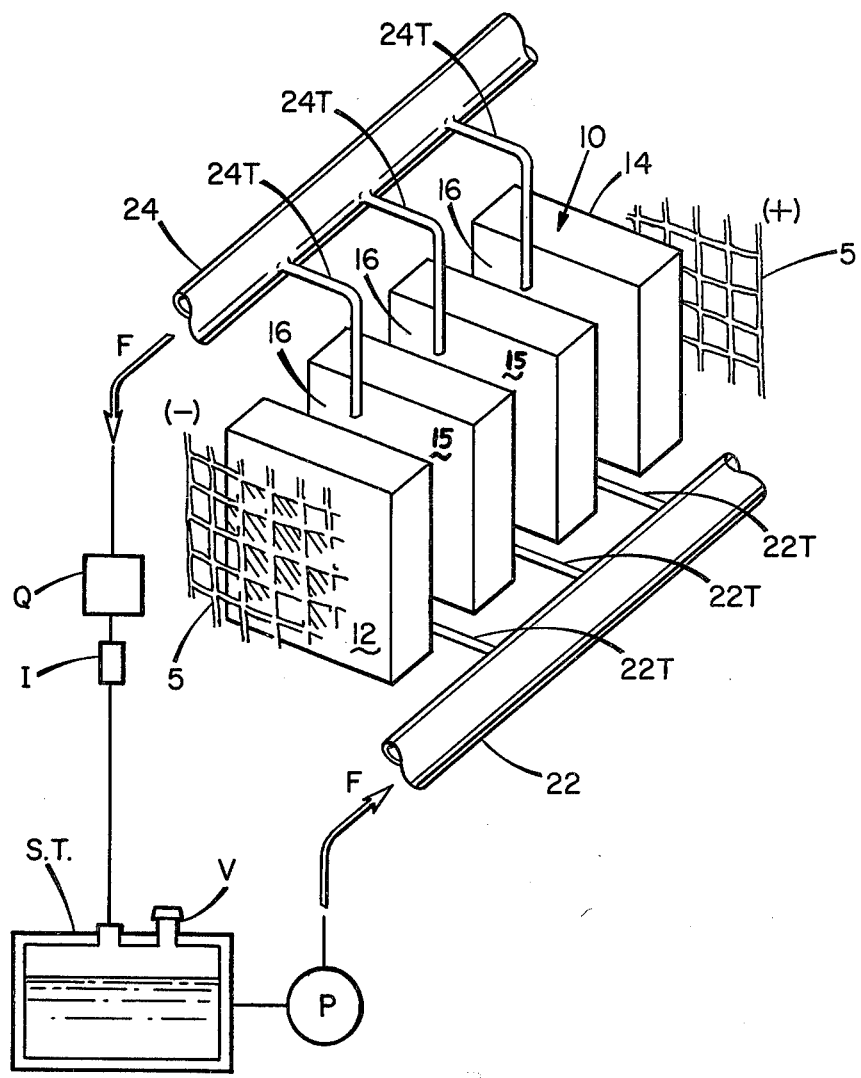

Referring now to FIG. 1 there is shown a battery 10 with end electrode assembles constituting an end anode 12 and cathode 14 and mid-electrodes 15 forming cells 16, (with spacing ported-membranes screen assembles) in an electrical series, fluid parallel array. An inlet maifold 22 and outlet manifold 24 provide flow through the cells of electrolyte as indicated by arrows F. An external flow system comprises a pump (P), and storage tank (S.T.) with gas vent (V), a monitoring instrument (I) and heat exchange (O). Screens 5 are affixed to (or encapsulated within) the end electrode assemblies.

A leak proof casing, preferably of inert plastic (e.g. an epoxy encapsulation), is applied to the exterior of the battery 10 of FIG. 1 (but is not shown in such figure.). Tributaries 22T and 24T of manifolds 22 and 24, respectively pass into the spaces between electrode assemblies 12/14/16 (each such space and the opposing, slightly spaced, parallel electrodes defining it constituting a cell) to define elongated, low cross-section paths (to limit electrical current leakage from cell to cell through the conductive electrolyte). The tributaries are very thin compared to the manifolds and are constructed such that cell to cell current leakage of the battery produces less than 1% degradation of current generating efficiency.

Figure 4:
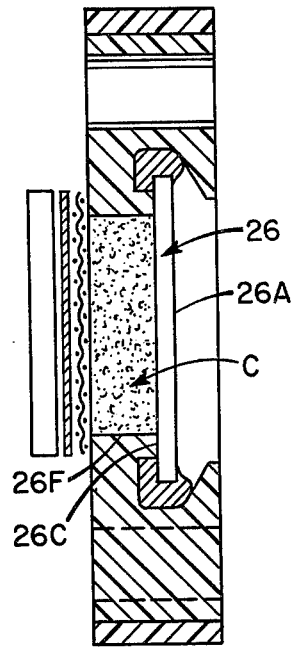
FIGS. 2–4 are, respectively, face, and cross-section views of an electrode assembly element of the FIG. 1 battery apparatus (including portions of other such assemblies in FIGS. 3 and 4 and portions of battery apparatus casing in all such views), the sections of FIGS. 3 and 4 being taken as shown, respectively, by arrows 3—3 and 4—4 in FIG. 2.
Figure 2:
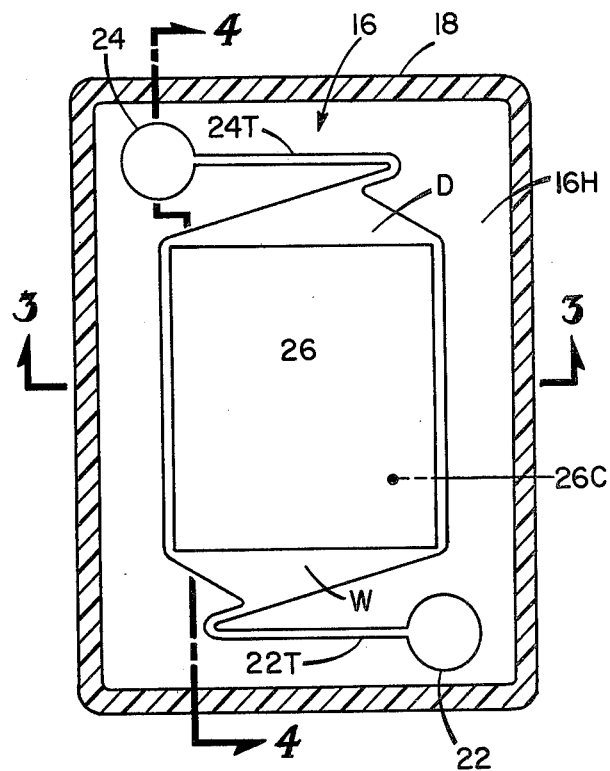
Figure 3:
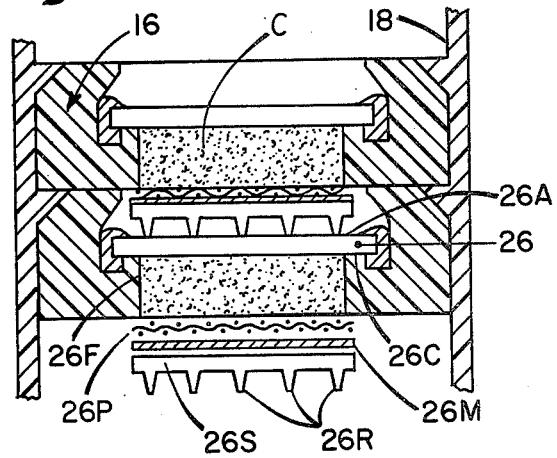

FIGS. 2–4 show one of the mid-electrode assemblies 16 in greater detail within the epoxy encapsulation covering 18 of the battery. Each such assembly comprises an electrode substrate 26, which is a planar conductive carbon-plastic composite of low lateral (perpendicular to the plane of the substrate) and low sheet resistivity. Such substrates have opposing faces usable as anode and cathode faces, which faces may be of identical form, or different form as hereinafter described. The anode face is designated 26A and the cathode face of 26C in FIGS. 3 and 4.

It will be appreciated that while only two mid-electrode assemblies are shown in FIG. 1, the batteries 10 will—in practice—comprise at least ten and in many cases substantially over twenty such electrode assemblies 16 in a long array between the end electrodes 12 and 14. It will be appreciated that the electrode substrate of the end electrode assembly 12 provides anode face usage only and that the electrode substrate of the end electrode assembly 14 provides only cathode face usage. The electrode substrates are preferably made of a hot pressed mixture of graphite and bromine resistant plastic, preferably polyvinylidene fluoride (but less expensive resins can be employed for some applications, e.g. acrylonitrite-butadiene-styrene (ABS) or polyvinyl chloride (PVC).

Each anode face 16A preferably has a surface enhancement ratio (actual surface area to planar projection area) of at least 3:1, preferably over 5:1. Such enhancement helps assure uniformity of zinc plating on the anode face during battery charging and good adhesion of the plating. The enhancement may be provided by diverse means, e.g. cross-hatch scoring of a pressed substrate or molding in ridge or hump patterns or embedding particles in the surface (preferably particles of such low conductivity relative to the substrate—a fraction of 1/1000th or less—as to constitute a virtual insulator by comparison). It is also desirable to similarly enhance the surface of cathode face 26C; but in such case the particles in the surface (if that approach is used) would be conductive.

Figure 2A:
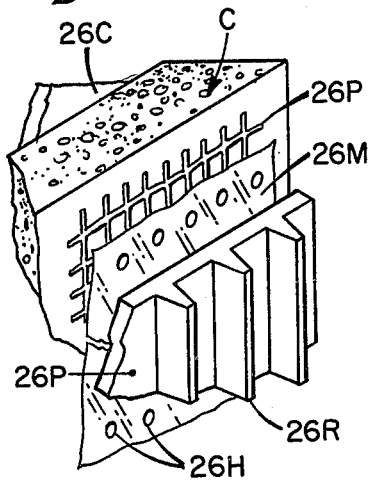
FIG. 2A is a portion of the face view of FIG. 2 overlaid with portions of the items which, in practive, cover the electrode substrate element face, shown without covering in FIG. 2.

The cathode face 26C is covered with unbonded activated charcoal in an amount and depth proportioned to the battery's energy storage specifications. The charcoal is retained within a rectangular curbing frame 26F, overlaid with a polypropylene screen cover 26P which is in turn overlaid with a membrane 26M and a spacer screen 26S with ribs 26B. The membrane is provided with vent holes 26H at the bottom as shown in FIG. 2A and also at the top. Such hole arrays 26H span the width of membrane 26H at top and bottom. They allow electrolyte flow to enter from the main cell channel to the zone containing the charcoal and equalize pressure on initial admission of flow to the cell. Thereafter recirculating electrolyte flow favors the lower flow resistance main cell channel over the essentially static liquid path through the charcoal array. Yet there is sufficient flow in the charcoal to allow gasses, including oxygen which evolves in the charcoal area, to excape through the electrolyte flow, and eventually to escape via the vent (V) of storage reservoir (S) (FIG. 1).

A preferred material—of the cover 16P is a Pellon brand non-woven fabric, heat bonded (at fiber crossovers) using polypropylene fibers so constructed to form a non-degrading porous mat. It maintains chemical inertness, structural integrity and mechanical strength under cell operation conditions and has attributes of low resistance, light weight and low cost. A preferred material of the membrane 26M is W. R. Grace Co's Daramic brand microporous polyethylene sheet. A preferred material for surfacing anode face 26A is a silicon dioxide particle layer which serves to anchor the zinc plating and makes the anode surface more wettable. Active carbon (preferrably Barnably-Cheney's UU or OL grades by Calgon Co. type - -) is pressed into the cathode face 16C to enhance contact between substrate 16B and the charcoal particles.

Figure 2B:
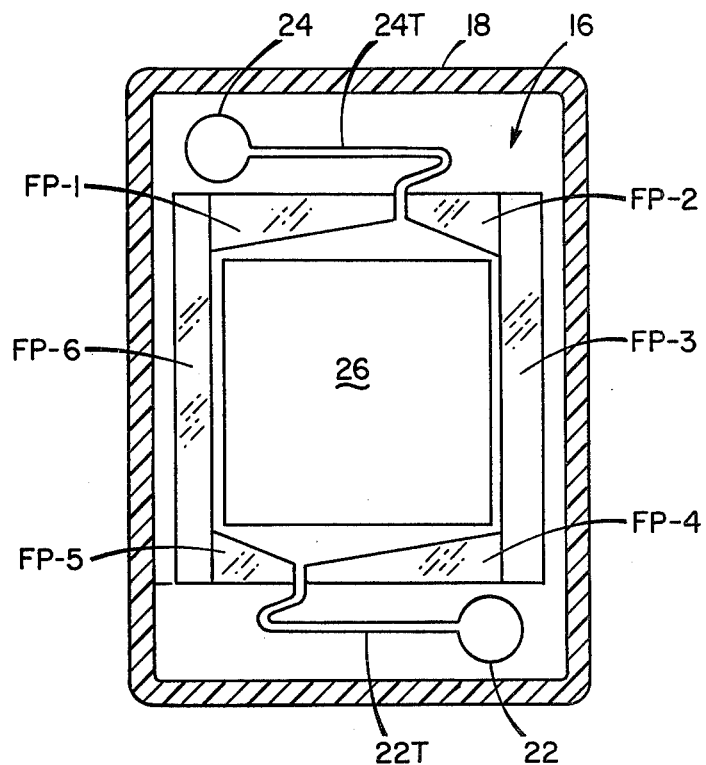
FIG. 2B is a view similar to FIG. 2 defining another and preferred embodiment of a framing portion of the invention.

The electrode substrates are held in holders 16H which are frames, preferably made of PVC or polyurethane. The carbon particle holding region is defined by a frame 16F which may be in an inner edge of holder 16H or may comprise separate framing pieces inserted in a rectangular arrangement to define the carbon particle mass. (See FP-1–FP-6 in FIG. 2B). In such case an electrode substrate plate 26 is employed with active surface particles embedded only in region 26'' of its cathode face.

The carbon particle mass is held and slightly compressed in the space defined by such framing and the overlying covers 26P, 26M, 26S with ribs 26R and the substrate 26. No binders are used and the carbon is amply filled in such space and lightly compressed by the repeating arrangement of items 26C, 26P, 26M, 26S, 26C, 26P, 26M, 26S, etc., between end electrodes 12 and 14. Such compression arrangement affords reliable spacing and retention of elements 26, 26P, 26M, 26S, none of which would be rigid per se, but behave as though rigid in a stacked array between 12 and 14 to help assure uniformity of electrolyte flow between electrodes and avoidance of electrodes randomly sagging towards each other. The ribs 26R of screens 26S also help to distribute the upward electrolyte flow. A well (W) and dome (D) are provided between adjacent electrode assemblies below and above each electrode substrate 26 through appropriate cutaways of holders 16H to define areas outside of electrode zones—an escaping gas region in dome (D) and an escaping liquid region (providing a region for flaked-off particles of zinc coatings) in well (W). The dome and wells are Vee-shaped for assuring complete capture and their apexes are offset for optimizing uniformity of electrolyte flow from the tributary 22T which feeds well (W) to the tributary 24T which is the outlet for exiting liquid (and any escaping gasses), and additionally offset in a way that allows maximizing lengths of such tributaries in the limited spaces of holder 16H. A sealant 16S, preferably of epoxy, surrounds each electrode substrate 26 to secure it to the holder 16H and assure that there is no leakage around such edges (to avoid chemical reactions, which would parasitically degrade the main electrochemical reactions of the battery).

The electrodes are constructed of graphite and fluorocarbon binders, a material not easily cemented or glued. Except for solvent welding of two identically materialed components such as PVC or ABS, cementing or adhering two parts together may be unreliable and cementing two large areas or long length parts with glues, epoxies, etc. in a manner which will not develop fluid leaks is not practical.

The two major issues which must be addressed in the construction of a module are:

1. Isolation of all edges of electrodes from the electrolyte in order to prevent electrical short circuiting across multiple cells with the probable zinc dendrite growth across electrode edges.

2. Leak prevention between electrode faces to the channels and/or common manifolding of multiple cell arrays. Such leaks will increase parasitic or intercell electric current losses causing rapid self discharge and lower energy storage efficiency of the system. Solid edge casting of electrode encapsulation in one continuous piece of material as described below positively avoids these problems.

In order to ensure sealing of all edges and isolation of electrolyte channels a multiple step casting is employed.

3. A stack of bipolar electrodes is clamped together with sufficient force to hold the array together, maintain parallel configuration and to suspend the electrodes. The electrode edges are dipped into a tray type mold for casting of Epoxy. Each of the four edges is thus "potted" by suspending the array or stack about 0.5 inches above the bottom of the shown mold. Epoxy is poured into the mold up to a predetermined level into the stack.

After curing of each edge, the mold is released and the next edge is "potted" in a similar manner. The manifolds and channels are mounted before "potting" top and bottom edges Electrolyte compostion for the $ZnBr_2$ system have a range of concetrations and ingredients depending upon the properties desired.

Figure 7:
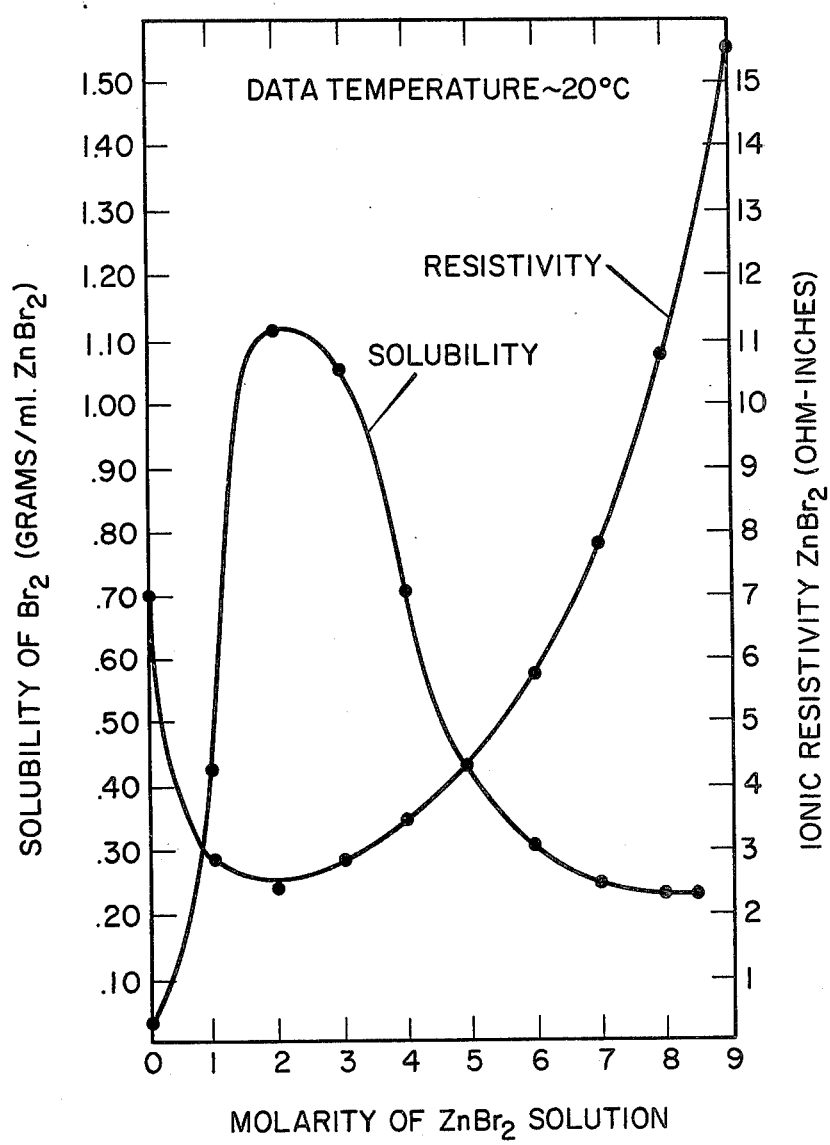
FIG. 7 comprises traces of bromine solubility and zinc bromide ionic resistivity in relation to molarity.

High drain rate (high power density) units employ electrolyte of lowest available resistance resulting the regime of such low resistivity shown in FIG. 7. High energy capacity module designs will tend to use relatively high concentrations of $ZnBr_2$ salt to minimize water weight and, in some designs, complexing agents for increased capacity and charge retention and a brighter additive for improved zinc plating quality (lower dendritic growth).

Some typical compositions are:

(a) a 2.0 molar solution of $ZnBr_2$, with an added 200 gm of $NH_4Cl$ per liter of total solution, for high power cells. This results in a low resistance electrolyte at room temperature of about 1 ohm-in or 2–3 ohm-cm specific resistivity. Addition of LiBr to the electrolyte also reduces resistance as is shown in the following table:

MIXED ELECTROLYTE DATA
(Total Volumes = 100 ml.)

| Solution gms $ZnBr_2$ | Composition gms KBr | Resistivity ohm-in | Specific Gravity $gm/cm_3$ | $ZnBr_2$ Molarity | KBr Molarity |
|---|---|---|---|---|---|
| 50 | 20 | 3.2 | 1.50 | 2.2 | 1.7 |
| 50 | 40 | 2.6 | 1.61 | 2.2 | 3.34 |
| 50 | 60 | 2.1 | 1.73 | 2.2 | 5.0 |
| 50 | 70 | 1.8 | 1.75 | 2.2 | 5.8 |
| 72 | 40 | 2.2 | 1.72 | 3.3 | 3.34 |

LiBr is a more expensive salt than $NH_4Cl$ however.

(b) 2..5–3.0 Molar $ZnBr_2$ solution with 100 to 200 gm $NH_4Cl$ per liter total solution with 15 to 20 gm of polyethylene gycol (PEG) of molecular weight—4000 or 10 or 15 gm PEG—6000 per liter provides a general purpose composition for such applications as vehicle drive and electric utility load leveling. An additive of 10 cc/liter of solution (Isobrite 488 or 484 of Allied-Kelite Co.), may be added as a brightener for zinc plating.

(c) the electrolyte may be optimized for maximum energy density (minimum water weight) for use in high capacity, low drain rate designs (e.g. for powering traction motors), by use of 3.0–5 Molar $ZnBr_2$ with 50 to 100 gm $NH_4Cl$ per liter of solution. The same additive as in (b) above may be used as a zinc brightener. Addition of 0.5% or less by weight of syrup, dextrin or licorice also improves zinc plating quality measureably in this electrolyte. Addition of 10 to 15 gm of polyethylene glycol (PEG)—6000 per liter of solution increases capacity of 10 to 15%.

pH stabilization or balance of electrolyte is achieved automatically in cells as described herein because of the hydrolysis of $Br_2$ in the presence of active carbon. The carbon catalyzes the reaction:

$$Br_2 + H_2O \rightleftharpoons HBr + HBrO \qquad (III)$$

and the oxygen is released from the HBrO at a later time thus balancing the loss of $H_2$ at the zinc electrode. The hydrogen loss at the zinc or negative electrode is via the reaction:

$$2HBr + Zn \rightleftharpoons H_2 + ZnBr_2 \qquad (IV)$$

Hence, the pH reaches a relatively stable range of values of between 2 and 4 during cell operation depending upon temperature, state of charge and electrolyte compostion. Unfortunately, the last reaction above represents a coulombic loss in efficiency and should be minimized in any event.

The presence of $NH_4Cl$ salt tends to lower the pH in the immediate vicinity of the charcoal thus pushing the first reaction above to the left because of the increased $H+$ ion concentrations as a result of the acidic hydrolysis of $NH_4Cl$. This increases charge retention and reduces $H_2$ gassing. Many other soluble salts of strong acids and weak bases will function in the same way such as $NH_4Br$. The $NH_4Cl$ is convenient because of its lower cost and weight and availability. Make-up water must be added periodically to account for the slow decomposition of the electrolyte solvent. However, a platinum type of catalyst may be employed as in other systems at present to recombine the $H_2$ and $O_2$ in the tank to water again—thus eliminating the need to add make-up water, also no vent is necessary.

Electrolyte pH control is an important feature of use of active carbon electrodes. Since the pH of $ZnBr_2$ solution is acidic e.g., in the range of 2–4 during normal cell operation, $H_2$ gas is generated at the surface of the negative electrode.

$$Br_2 + H_2O \rightleftharpoons HBr + HBrO \qquad (V)$$

thus regenerating H+ ions which are lost at the negative electrode and with the eventual liberation of $O_2$. Hence, there is no need for making other ancillary provisions for pH regulation as there is in other prior art systems.

pH stabilization or balance of electrolyte is achieved automatically in these cells because of the hydrolysis of $Br_2$ in the presences of active carbon. The carbon catalyzes the reaction.

$$Br_2 + H_2O \rightleftharpoons HBr + HBrO \qquad (VI)$$

and the oxygen is released from the HBrO at a later time thus balancing the loss of $H_2$ at the zinc electrode. The hydrogen loss at the zinc or (+) electrode is via the reaction.

$$2HBr + Zn \rightleftharpoons H_2 + ZnBr_2 \qquad (VII)$$

Hence, the pH reaches a relatively stable range of values of between 1 and 4 during cell operation depending upon temperature, state of charge and electrolyte compostion. Unfortunately, the last reaction above represents a coulombic loss in efficiency and should be minimized in any event.

The electrode assemblies are manufactured as follows:

I. Making the substrates 26
  A. Tare a plastic container and weigh out the desired amount of Kynar (grade 461—Pennwalt Corp.), and place in a mixer with, e.g., about 2000 g capacity for such formulations as:
    1. For a 50/50 (by weight) mixture: 1000 g Kynar; 1000 g Graphite
    2. For a 60/40 (by weight) mixture: 800 g Kynar; 1200 g Graphite
    3. For a 70/30 mixture: 600 g. Kynar; 1400 g Graphite
  B. Tare a plastic container and weigh out a corresponding amount of graphite (#8484—Dixon Cruicble Co.). Pour the Kynar and Graphite in blender.
  C. Mix Kynar/Graphite in the mixer and filter through a screen to remove debris.
  D. In a tray, place an aluminum plate (machine tooled and heat treated) covered by Teflon-coated release paper and a frame cut to desired electrode size.
  E. Sprinkle a light layer on the negative surface (anode) of Celite brand (#560—Johns Manville Inc.) inert particles onto release paper inside the frame.
  F. Move the plate to a second tray (to avoid contamination of components). Sprinkle desired Kynar/Graphite mixture, with a flour sifter, over the Celite layer until the frame is filled.
  G. Trowel the mixture smooth and compress lightly with a PVC plate. Remove the frame.
  H. Move the assembly back to the first tray. Sprinkle the positive surface with activated carbon (UU Barneby-Cheney or OL Grade). Scrape excess Celite, Graphite, and carbon from the plate edges.

I. Surround the electrode with 0.25" wide silicon rubber strips to prevent graphite flow.

J. Cover the electrode with the following:
1. Teflon release paper;
2. Silicon rubber resilient plunges (prevents electrode porosity);
3. Teflon release paper;
4. A top aluminum plate;

K. With the above electrode setup in upper platens of a 100 ton press, preheat for 2 minutes at 375° F. if powder is wet (this allows gases to escape) and then press the electrode at 375° F. for 5 minutes (50 tons pressure per 250 sq. in. electrode area). Press the electrode for 8 minutes to room temperature on lower platens with water flowing.

DESIGN FOR TRIBUTARY LENGTHS

In order to minimize parasitic current losses (coulombic loss) through the common electrolyte via the manifolds, long electrical path length tributaries are employed connecting the manifolds with each cell.

The ratio of length, l, to cross sectional area, a, of the channels (tributaries) is determined by these conditions:
1—Permissible parasitic losses
2—Conductivity of electrolyte
3—Charge—discharge current range of cells.

Middle cells of a bipolar stack experience the largest loss due to such interconnective current flows. Hence, calculations are based upon these worst case cells.

The mathematical relationship which has been derived to express this "worst case" dissipative current, $n/2$, is given as follows:

$$N/2 = \frac{N^2 E}{4R} - \frac{E}{R}\left[\left(\frac{N}{2}-1\right)\left(\frac{N}{2}-2\right) - \sum_{y=4}^{N/2}(y-3) + 1\right]$$

where the variables are:
N = Total number of cells per bipolar stack
R = Electrical resistance of a channel
E = Open circuit or driving potential of a cell ~1.7 volts
l = Path length of channels
α = Area of channels
ρ = Specific resistivity of electrolyte ~2 ohm-inches The resistance of a channel is expressible as $$R = \rho \frac{l}{\alpha} = 2\frac{l}{\alpha} \text{ ohms}$$

The table below presents a set of values for N/2, or $\eta$ where $\eta = N/2$, for various stack sizes for a $ZnBr_2$ systems with the above constants.

| Number of Cells, N | $\eta$ | $\eta$ |
|---|---|---|
| 10 | 5 | 14 E/R = 11.9 α/l |
| 16 | 8 | 36 E/R = 30.6 α/l |
| 20 | 10 | 55 E/R = 46.8 α/l |
| 30 | 15 | 120 E/R = 102 α/l |
| 40 | 20 | 210 E/R = 179 α/l |

These currents are for each manifold connection. Consequently, in the single electrolyte $ZnBr_2$ system the above values of $\eta$ must be multiplied by 2; e.g. exit and entrance manifold.

As an example of the significance of these losses in an actual design the following calculations are performed.

A typical cell size being fabricated at GEL for load leveling applications has an active area of 300 in$^2$ and a nominal current drain of 20 amps for four hour rating.

If a loss of 1% in terms of relative current drain is permitted in the channel for the middle cells as compared to the normal cell discharge current of 20 amps, then for a 16 cell array the value of $\eta = 0.20$ amps and we solve for (α/l) in the table above for the N=16 expression.

$$\alpha/l = 0.20 \text{ amps}/30.6 \text{ inches}$$
$$= 0.0065 \text{ in}.$$

If the channel diameter is 0.20 inch giving a cross sectional area of 0.0314 in.$^2$, (a typical value in present designs), then the minimum necessary length, l, per tributary is $$l = \frac{0.0314 \text{ in}^2}{0.0065 \text{ in}} = 4.8 \text{ in}$$

Various other tributary lengths and areas may be similarly computed via the above relationships for different design criteria of permissible losses, discharge current and stack size, N.

BROMINE VAPOR VENT TRAP

A regenerable vent trap may be provided in reservoir R for entrapment of free bromine traces escaping from the electrolyte through the $O_2$ and $H_2$ venting of the reservoir.

Data obtained for equilibrum vapor pressure of $Br_2$ in the presence of adsorbed $Br_2$ on active carbon surfaces shows that for 0.1 to 0.2 gm of $Br_2$ per gram of carbon (activated coconut charcoal) the partial pressure of $Br_2$ is significantly less than $10^{-3}$ mm. of Hg. This gives a presence of 1 part per million of $Br_2$ in a vent trap with active carbon at rated saturation of 0.1 to 0.2 gm of adsorbed $Br_2$. Partial pressures of much less than 0.01 ppm of $Br_2$ are maintainable even in the worst rated conditions for system operation.

Figure 1A:
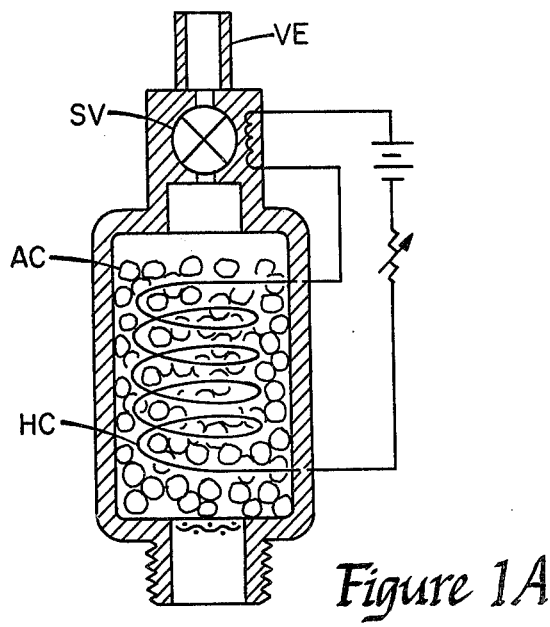
Figure 1B:
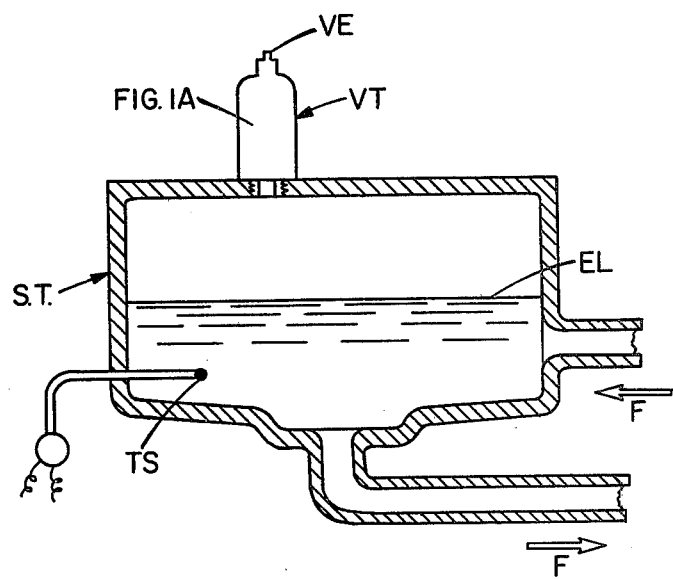

FIGS. 1A and 1B show a simple vent trap (VT) with an electrically activated shut-off valve (SV) and heater coil in reservoir (R). When the activated carbon requires regeneration, electrical power is supplied to the shown titanuim or tantalum heater coil (HC). Activated charcoal particles (AC) surround the heater coil. The heater wire is placed within the vent housing to maximize heat transfer to the carbon particles. The metals titanium and tantalum are preferred for the coil because of their corrosion resistance to the bromine environment.

When the heater is functioning the solenoid valve (SV) at the vent exit (VE) is simultaneously energized. The vent closes during heating forcing the liberated $BR_2$ from the carbon to re-enter the electrolyte tank for redissolving in the electrolyte. The electrical connections for the heater and valve circuits are shown in series to emphasize the need for simultaneity of electrical activation.

More elaborate designs than this can be made which would force the liberated $Br_2$ into the electrolyte via a second vent tube directly submerged in the electrolyte. This would necessitate a two way vent valve and more complex geometry.

Experience has indicated that the need for regeneration in a suitably sized vent trap will occur only once every six months or a year for "normal" system operation.

Vent traps are a necessity to practical utilization of a $ZnBr_2$ system. Health hazard, discomfort factor and corrosion issues require a means of preventing significant $Br_2$ escape into the atmosphere. A regenerable trap eliminates the need to add HBr to the system periodically and to replace the activated carbon.

The trap is located above the electrolyte level (EL) in the reservoir (R). A temperature sensor (TS) for system control may be located below the liquid levels for direct electrolyte temperature measurement.

SAFETY FACTORS

When the electrolyte temperature rises above a preset value such as 140 to 170 degrees F., a control unit I (FIG. 1) sensing the cut-off temperature switches off the power to the motor of pump (P). Electrolyte drains backwards through the well (W), the pump (P) into the storage tank 5.

Another more rapid approach to draining may be employed in which the motor is bypassed by a large drain line into the reservoir and not only is the pump motor switched off when the temperature becomes too high, but a solenoid activated or back pressure release valve opens into the drain. Positive displacement pumps could then be used in such a configuration.

The electrolyte flow rates for a bipolar array of 17 electrodes with plate areas of 200 sq. in. is between 1 and 2 gallons/minute and a pressure head of 0.5 to 1.0 psi. Slower flow rates may be employed.

TESTS

Figure 5:
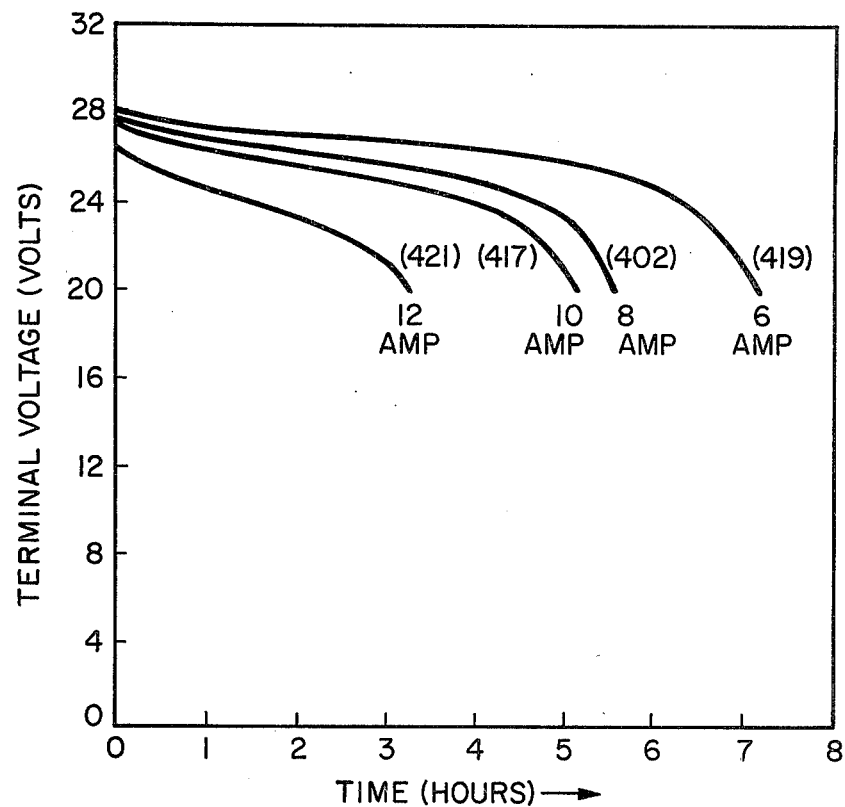
FIG. 5 is voltage-time trace for batteries made in accordance with the embodiment of the invention described in FIGS. 1–4 above (with the FIG. 2B modification)
Figure 6:
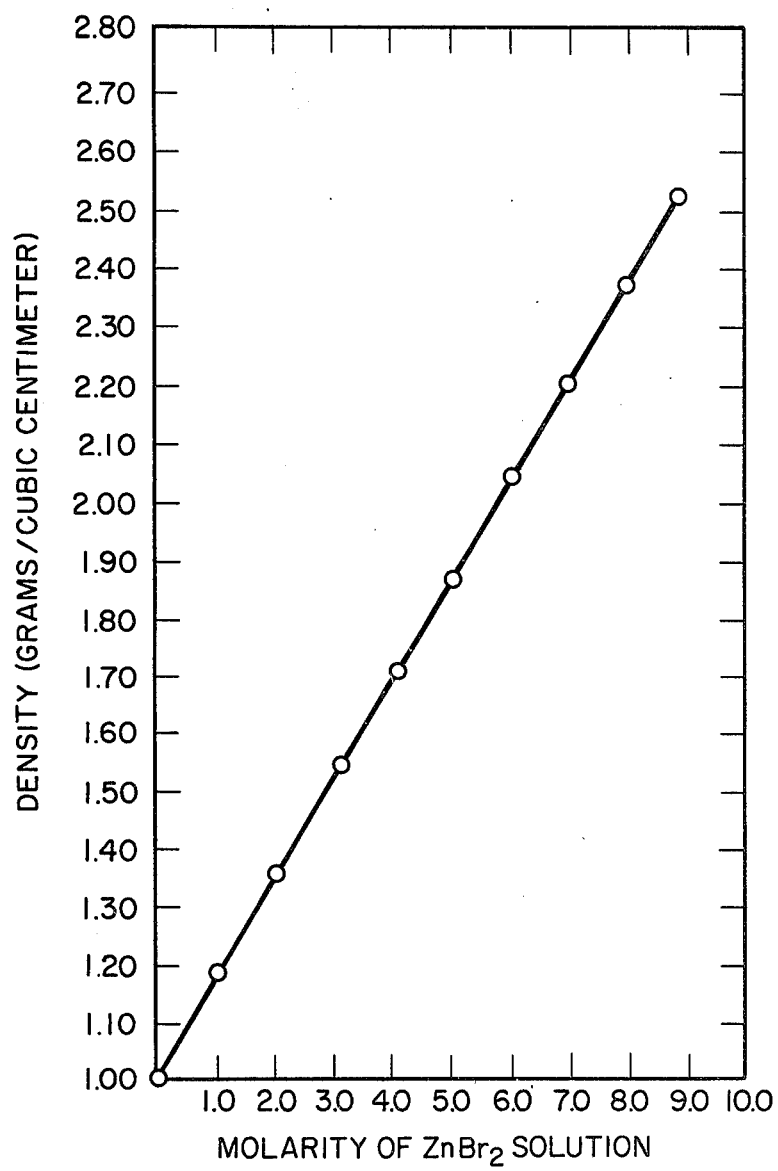
FIG. 6 is a trace of specific gravity of zinc bromide in relation to molarity.

Batteries made as described above were repeatedly cycled 25 times or more through constant charging current at 8 amperes and constant current discharge at 6, 8, 10 or 12 amperes (Amp). No degradation of the voltage-time characteristics of the discharge cycles was noted over the course of such repeated cycling. The voltage-time characteristics are shown in FIG. 5 where voltage (volts) at the terminals (screens (S) in FIG. 1) is plotted against time (hours) of discharge cycle. Electrolyte pH, temperature and pressure drops were continuously measured and found to remain in normal circuits. The test batteries were one kilowatt hour systems comprising 12 cells with 140 sq. in. electrode faces, an electrolyte (zinc bromide solution) flow rate of 1.0 gallons per minute, specific gravity of electrolyte of 1.45 at end of charge and 1.54 at end of discharge, pH of 3 at end of charge and 4.0 at end of discharge and gas evolution rate of 10-20 milliliters per minute through filter F (FIG. 1).

While zinc-bromide solutions are disclosed herein, other metal-bromide solutions may be utilized as the electrolyte.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by the apparatus and techniques herein disclosed and limited solely by the spirit and scope of the appended claims.

What is claimed is:

1. A metal-bromide secondary battery comprising:
   (a) means defining an array of bipolar electrode assemblies physically spaced from each other and arranged parallel to each other;
   (b) each such bipolar electrode assembly having an electrode substrate of planar form with an aspect ratio of less than two, an area of at least 200 sq. in. an anode face and a cathode face, the electrode substrate comprising an inert material of low electrical resistance perpendicular to the sheet, i.e. on the order of less than 0.01 ohm-sq. in. and low sheet or bulk resistivity, i.e. on the order of less than 10 ohm-cm;
   (c) each such electrode assembly comprising discrete charcoal particles arranged and held at the cathode face without binders, the particles being in electrical contact with each other and at least a portion thereof being in contact with the cathode face;
   (d) means providing a surface enhancement of the anode face of at least 3 times;
   (e) means for circulating an electrolyte of aqueous metal-bromide solution between bipolar electrode assemblies comprising inlet and outlet manifolds spanning the array and having elongated tributaries of each such manifold extending therefrom to an electrolyte flow space between each pair of opposing bipolar electrode substrates, the tributaries providing a high resistance electrical path from each manifold to the electrolyte flow space between the confronting electrode assemblies, the tributaries terminating in respective inlet and outlet through arrangements below and above the confronting anode and cathode faces;
   (f) means for recirculating the electrolyte from the outlet manifold external to the batteries and then through the inlet manifold and constructed and arranged for complete drainage of electrolyte from the battery automatically upon selected abnormal occurrences;
   (g) means for establishing a continuous, but relatively small, flow of electrolyte at the cathode face compared to an order of magnitude larger such flow of electrolyte between the membrane and anode face in each electrolyte flow space between confronting electrode assemblies;
   (h) means defining end electrodes, one with a cathode face and one with an anode face, configured similarly to the intermediate electrode assemblies bracketing the bipolar electrode assembly array and further defining external circuit connections mounted to said end electrodes;
   (i) means for flowing recirculating electrolyte between the end electrodes and the respective nearest bipolar electrode assemblies from inlet to outlet manifolds in the same manner as between bipolar electrode assemblies;
   (j) means encapsulating the edges of the substrates of the electrode assemblies but allowing flow through said manifolds and tributaries to define an enclosed, leak-proof battery;
   (k) means forming spaces between the anode faces and charcoal-overlaying membranes of opposing electrode assemblies;
   the said apparatus of (a)-(k) being constructed and arranged such that under charging conditions, the recirculating of an aqueous metal-bromide solution electrolyte produces a build-up of metal plating out of the metal on the anode faces of the electrodes and increased storage of halogen at the charcoal particles of the cathode faces; that under discharging conditions, produces a reduction of plating at anode faces by re-ionization of the metal and redissolving in the electrolyte and a reduction of halogen storage by re-ionizing and redissolving in the electrolyte; that the unbound charcoal induces hydrolysis of bromine to HBr and HBrO to an extent automatically compensating for the tendency of the electrolyte to become increasingly basic due to hydrogen evolution and thereby provide intrinsic pH control; such that dendrite shorting and excess chemical bromine-zinc reactions are prevented by provision of a liquid well and a gas dome and uniform spreading of liquid; and that the stack of electrode assemblies and membranes and spacers is under a controlled compression to maintain rigid electrode form and determined spacing of electrodes.

2. The secondary battery of claim 1 wherein the surface enhancement of the anode face is provided by irregularity of the face without substantially breaking the material homogeneity of the substrate.

3. The secondary battery of claim 1 wherein the surface enhancement of the anode face is formed by contouring its face by molding and/or abrasize grooving thereof.

4. The secondary battery of claim 1 wherein the surface enhancement of the anode face is formed by foreign materials embedded in the surface of the substrate at its anode face.

5. The secondary battery of claim 4 wherein the foreign materials are of particulate form.

6. The secondary battery of claim 4 wherein the foreign materials on the negative electrode are of such low electrical conductivity to constitute insulator material relative to the substrate.

7. The secondary battery of claim 1 wherein at least 3 times surface enhancement is provided at the cathode faces of the electrode assemblies.

8. The secondary battery of claim 1 wherein such mid-electrode assembly comprise screen and membrane means overlying the conductive particle stack at the cathode faces.

9. The secondary battery of claim 2 wherein spacer elements extend across each cell from an anode face to the membrane screen means overlying conductive particle piles at the cathode faces, the array as a whole being compressed to thereby essentially restrain the particles from movement or from loosening the bonding contact they have with each other and/or the cathode face, and wherein the screen/membrane means are ported at flow inlet and outlet ends of the cell to provide a diversion passage of fluid through the conductive particle batches.

10. The secondary battery of claim 1 wherein the storage capacity of the recirculating loop outside the cells is at least equal to the volumetric capacity of the cells and arranged so that all electrolyte can be drained and the storage capacity is no more than 3 times the cell's volumetric capacity.

11. The secondary battery of claim 1 wherein the encapsulation means (j) comprise a continuous sheath of inert material around the edges of the electrode assemblies substrates.

12. The secondary battery of claim 11 wherein such sheath comprises plastic material and is formed by dipping the substrate edges, while the electrode assemblies are arrayed together into a bath of such plastic material.

13. The secondary battery of claim 11 and further comprising means for trapping, and preventing escape of bromine vapors inherently generated in battery operation.

14. The secondary battery of claim 13 wherein said means for trapping bromine vapors are constructed and arranged to return trapped bromine to the recirculating electrolyte.

* * * * *